March 18, 1952  S. NOODLEMAN  2,589,278
MOTOR CONTROL SYSTEM
Filed March 5, 1949

INVENTOR.
Samuel Noodleman,
BY Dybvig & Dybvig,
His Attorneys.

Patented Mar. 18, 1952

2,589,278

UNITED STATES PATENT OFFICE 2,589,278

MOTOR CONTROL SYSTEM

Samuel Noodleman, Dayton, Ohio, assignor to Louis R. Mahrt and D. Robert Laughter, as trustees for the Standard Dayton Corporation, Dayton, Ohio, a corporation of Ohio Application March 5, 1949, Serial No. 79,846

12 Claims. (Cl. 318—221)

This invention relates to a motor control system and more particularly to a speed responsive control which is especially suitable for use in controlling the energization of the starting winding of a single phase or split phase motor.

A large number of motor controls have been devised from time to time and have been used with varying degrees of success, but all have had disadvantages either in that they have not been truly speed responsive through the range of voltages normally encountered or have not been practical from a structural standpoint. This is particularly true in regards to controls for hermetically sealed motors of the type commonly used for driving refrigerant compressors, for example. In most hermetically sealed motors, it is not practical to incorporate within the sealed motor housing any mechanical speed responsive devices or any form of electric switching means.

It is an object of this invention to provide a truly speed responsive relay which need not be located directly within the motor housing.

It has been discovered that all conventional motors, both A. C. and D. C., generate a ripple voltage, the frequency of which is determined by the speed of the armature bars or conductors as they pass the stator teeth or slots. I have also found that this ripple voltage can be used for control purposes by connecting a resonating relay across the terminals of a motor. This ripple voltage has a frequency considerably in excess of the 60 cycle voltage commonly used for energizing motors and consequently by using suitable means, such as a resonating relay, it is possible to utilize changes in the frequency in the generated ripple for controlling the energization of the starting winding of a motor or for controlling any other means, such as a speed indicating light. Thus, it is an object of this invention to provide an improved type of starting relay control which operates in response to a predetermined change in the frequency of the ripple voltage.

Another object of this invention is to provide a control which may be manufactured very cheaply and which is dependable in operation.

Other objects and advantages reside in the construction of parts, the combination thereof and the mode of operation, as will become more apparent from the following description.

Figure 1:
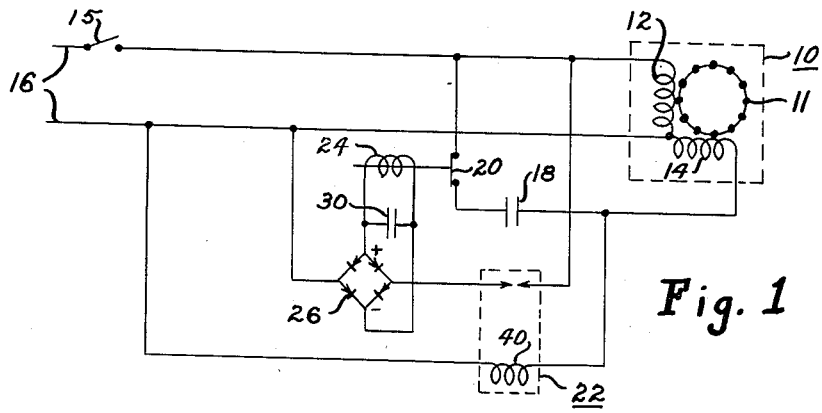
Figure 1 is a schematic diagram showing the circuit of a preferred embodiment of my invention.

Referring now to Figure 1 of the drawing wherein I have shown a preferred embodiment of my invention, reference numeral 10 generally designates a motor having a rotor 11 which for purposes of illustration has been shown as a squirrel cage rotor. In view of the principle of operation involved herein, the invention is equally applicable to motors having wound rotors. Reference numerals 12 and 14 designate the main and phase or starting windings respectively of a conventional split phase motor in which the main winding 12 is connected to the power supply lines 16 at all times when the main control switch 15 is closed and the phase winding 14 is connected in the circuit only during the initial starting period of the motor.

A condenser 18 and a relay operated switch 20 are connected in series circuit relationship with the phase winding 14 as indicated in Figure 1 of the drawing. A resonant type relay 22 has been provided, as shown, for controlling the energization of the phase winding control relay 24. The resonant relay 22 is tuned to be unaffected by the 60 cycle supply voltage but to close the circuit to the rectifier 26 when the frequency of the generated ripple voltage indicates that the speed of the motor 10 has reached the speed at which the phase winding 14 is to be disconnected. The output of the rectifier 26 is connected to the control relay coil 24 so that at a predetermined ripple frequency the relay coil 24 will be energized and the switch 20 will be moved to the open position.

The resonant relay 22 is preferably of the vibrating reed type and consequently it is desirable to provide a storage condenser 30 across the output of the rectifier 26 so as to cause the relay 24 to be held open continuously whenever the relay 22 energizes the rectifier 26 in accordance with well-known practice.

Figures 3, 4:
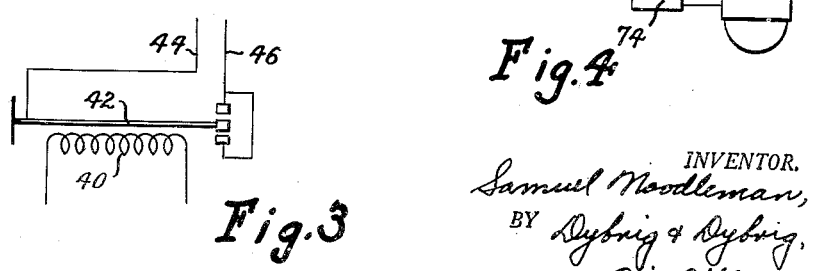
Figure 3 is a fragmentary schematic view showing the arrangement of a vibrating type of resonant relay.
Figure 4 is an elevational view, largely diagrammatic, showing my invention applied to a hermetically sealed motor compressor unit.

It is obvious that any conventional resonant relay could be used without departing from the spirit of my invention and that the relay could be connected to respond to the ripple generated in either the main or the phase winding. In Figure 3 of the drawing I have shown one type of vibrating reed resonant relay which could be used in the circuit shown in Figure 1. In this relay the reference numeral 40 designates the relay energizing coil and reference numeral 42 designates a vibrating reed which is designed to be vibrated by the coil 40 only at a predetermined frequency, with the result that when the frequency of the voltage supplied to the coil 40 reaches a given value, the reed 42 will begin to vibrate and will serve to close the circuit from the power line 44 to the contacts connected to the lead 46. Resonant relays of this type are now well-known to those skilled in the art and need no further description.

Figure 2:
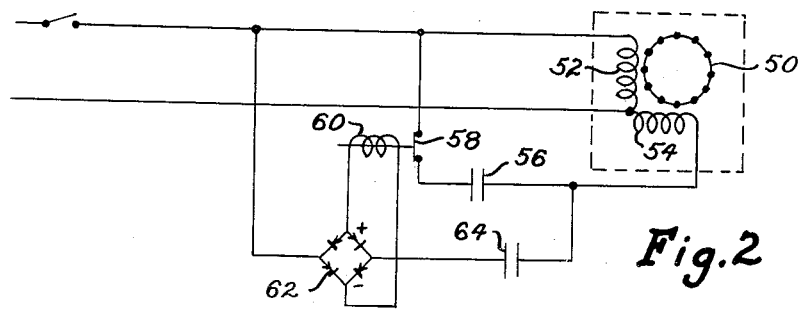
Figure 2 is a schematic wiring diagram showing a slightly modified circuit arrangement.

In Figure 2 of the drawing I have shown a slightly modified control arrangement. In this modification reference numeral 50 designates a conventional motor rotor which is arranged adjacent a main stator winding 52 and a starting winding or phase winding 54. A condenser 56 and a starting winding control switch 58 are arranged in series circuit relationship with the phase winding 54, as shown. The switch 58 is adapted to be controlled by a solenoid coil 60 connected across the output terminals of a rectifier 62. The input terminals of the rectifier 62 are connected in series circuit relationship with the condenser 64. The condensers 56 and 64 and the solenoid coil 60 form a resonant circuit wherein the relatively low frequency 60 cycle voltage is ineffective in operating the solenoid coil 60 but wherein the ripple voltage generated by the motor when it comes up to speed has a high enough frequency to cause energization of the solenoid coil 60.

Since one of the characteristics of resonant circuits and resonant relays is that they operate primarily in response to predetermined changes in the frequency rather than in response to fluctuations in the supply voltage or the supply current, it is obvious that the controls for the phase or starting winding of the motor in each of the above described systems operate in response to speed and are not disturbed by surge currents, abnormal voltage conditions, or the like. It is also obvious that the control may be mounted remotely from the motor.

In Figure 4 of the drawing I have shown one application of my improved control system. In this application a hermetically sealed motor 70, such as used for operating refrigerant compressors, is provided with an externally mounted control relay 74, such as shown in either Figure 1 or 2. This relay then controls the supply of current to the phase or starting winding of the motor. As indicated in this view, it is not necessary to increase the number of terminals on the motor housing nor is it necessary to insert any portion of the control relay mechanism within the housing of the motor 70.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In combination, a motor rotor, a main winding, a starting winding, means for connecting the main winding to a source of alternating current power having a frequency within a given frequency range, and means for connecting said starting winding to a source of power, said last named means including a resonant type of relay responsive only to voltages having a frequency above said given frequency range and operated in response to the ripple voltage generated within the motor for disconnecting said starting winding as the motor comes up to speed.

2. In combination with a 60 cycle, alternating current motor having a rotor, a running winding and a starting winding, means for controlling the supply of 60 cycle, alternating current to said starting winding, said rotor having conductor means therein arranged to induce a ripple voltage in said windings having a frequency in excess of 60 cycles at normal operating speeds of said rotor, and means responsive to a predetermined change in the frequency of the ripple voltage generated within one of said windings in response to the relative rotation between the rotor and said windings for operating said last named means.

3. In combination with a 60 cycle, alternating current motor having a stator and a rotor, at least one of which includes a main winding and a phase winding in which a high frequency ripple voltage is generated therein in response to relative rotation between said rotor and said stator, a frequency responsive control means for said phase winding responsive to frequencies above said 60 cycles and operating in response to a predetermined variation in said generated ripple voltage for controlling the supply of current to said phase winding.

4. In a control for the starting winding of a 60 cycle, alternating current motor of the type in which a high frequency ripple is generated within the motor during operation of the motor, a resonating relay responsive to frequencies corresponding to said high frequency ripple at the motor speed at which it is desired to have said switch means operate, means for supplying said high frequency ripple to said relay, and switch means operated by said relay for controlling said starting winding.

5. In combination, a motor rotor, a motor stator, said motor stator comprising a running winding and a starting winding, means for connecting said running winding to a source of power, means for connecting said starting winding to a source of power, said last named means including a condenser and a starting winding control switch, a condenser and a rectifier connected in series with one another and in parallel circuit relationship to said first named condenser and said switch, and a solenoid coil connected to the output of said rectifier and arranged to operate said switch, said condensers and said solenoid being tuned to operate said switch at a predetermined frequency of the ripple voltage generated in response to relative rotation of said stator and said rotor.

6. In a motor, a motor rotor, a main winding, a starting winding, means for connecting said main winding to a source of power, means for connecting said starting winding to a source of power, said last named means including a resonant type of relay operated only in response to the ripple voltage generated within the motor for disconnecting said starting winding as the motor comes up to speed, and a housing member for enclosing said motor rotor and said main and starting windings, said resonant relay being disposed externally of said housing member.

7. In a hermetically sealed split phase motor, a motor rotor, a motor stator, a housing enclosing said motor rotor and said stator, said stator comprising a running winding and a starting winding, means for connecting said running winding to a source of power including a main control switch, means for connecting said starting winding to said source of power, said last named means including a condensesr and a starting winding control switch, a condenser and a rectifier connected in series with one another and in parallel circuit relationship to said first named condenser and said starting winding control switch, and a solenoid coil connected to the output of said rectifier and arranged to operate said starting winding control switch, said condensers and said solenoid coil being tuned to operate said starting winding control switch at a predetermined frequency of the ripple voltage generated in response to relative rotation of said stator and said rotor.

8. In a motor, a motor rotor, a motor stator, said motor stator comprising a running winding and a starting winding, means for supplying power to said windings including power lines and a switch means for controlling the supply of current to said starting winding, and relay means connected across two of said power lines for controlling said switch means, said relay means comprising means responsive to a change in the frequency of the ripple voltage generated within one of said windings when the motor approaches normal operating speed for controlling the operation of said switch means in response to a predetermined change in the frequency of said ripple voltage.

9. In a hermetically sealed split phase motor, a motor rotor, a motor stator, a housing for enclosing said motor rotor and said stator, said motor stator comprising a running winding and a starting winding, means for supplying power to said windings including power lines and a switch means for controlling the supply of current to said starting winding, and relay means mounted externally of said housing and connected across two of said power lines for controlling said switch means, said relay means comprising means responsive to a change in the frequency of the ripple voltage generated within one of said windings when the motor approaches normal operating speed for controlling the operation of said switch means in response to a predetermined change in the frequency of said ripple voltage.

10. In a motor, a motor rotor, a motor stator, said stator comprising a running winding and a starting winding, means for connecting said running winding to a source of power including a main control switch, means for connecting said starting winding to said source of power, said last named means including a starting winding control switch, a condenser and a rectifier connected in series with one another and in parallel circuit relationship to said starting winding control switch, and a solenoid coil connected to the output of said rectifier and arranged to operate said starting winding control switch, said condenser and said solenoid coil being tuned to operate said starting winding control switch at a predetermined frequency of the ripple voltage generated in response to relative rotation of said stator and said rotor.

11. In combination, a motor rotor, a motor stator, said motor stator comprising a running winding and a starting winding, means for connecting said running winding to a source of power, means for connecting said starting winding to a source of power, said last named means including phase shifting means and a starting winding control switch, a condenser and a rectifier connected in series with one another and in parallel circuit relationship to said phase shifting means and said switch, and a solenoid coil connected to the output of said rectifier and arranged to operate said switch, said condenser, phase shifting means and said solenoid being tuned to operate said switch at a predetermined frequency of the ripple voltage generated in response to relative rotation of said stator and said rotor.

12. In a split phase motor, a motor rotor, a motor stator, a housing enclosing said motor rotor and said stator, said stator comprising a running winding and a starting winding, means for connecting said running winding to a source of power including a main control switch, means for connecting said starting winding to said source of power, said last named means including phase shifting means and a starting winding control switch, a condenser and a rectifier connected in series with one another and in parallel circuit relationship to said phase shifting means and said starting winding control switch, and a solenoid coil connected to the output of said rectifier and arranged to operate said starting winding control switch, said condenser and said solenoid coil being tuned to operate said starting winding control switch at a predetermined frequency of the ripple voltage generated in response to relative rotation of said stator and said rotor.

SAMUEL NOODLEMAN.

REFERENCES CITED

The following references are of record in the file of this patent:

UNITED STATES PATENTS

| Number | Name | Date |
|---|---|---|
| 2,407,994 | Menzies | Sept. 24, 1946 |
| 2,453,726 | Prouty et al. | Nov. 16, 1948 |